(12) United States Patent
Smith

(10) Patent No.: US 11,305,208 B2
(45) Date of Patent: Apr. 19, 2022

(54) CHILDREN'S TOY FOR GRILLING

(71) Applicant: Iisha Smith, Murfreesboro, TN (US)

(72) Inventor: Iisha Smith, Murfreesboro, TN (US)

( * ) Notice: Subject to any disclaimer, the term of this patent is extended or adjusted under 35 U.S.C. 154(b) by 0 days.

(21) Appl. No.: 16/434,433

(22) Filed: Jun. 7, 2019

(65) Prior Publication Data
US 2019/0381418 A1 Dec. 19, 2019

Related U.S. Application Data

(60) Provisional application No. 62/686,839, filed on Jun. 19, 2018.

(51) Int. Cl.
*A63H 33/30* (2006.01)
*A47J 37/07* (2006.01)
*A47J 37/06* (2006.01)

(52) U.S. Cl.
CPC ...... *A63H 33/3055* (2013.01); *A47J 37/0676* (2013.01); *A47J 37/0786* (2013.01)

(58) Field of Classification Search
CPC .............. A63H 33/3055; A47J 37/0676; A47J 37/0709; A47J 37/0786
USPC ........................................................ 446/481
See application file for complete search history.

(56) References Cited

U.S. PATENT DOCUMENTS

| | | | |
|---|---|---|---|
| 2,239,500 A | 4/1941 | Duke | |
| 3,120,718 A | 2/1964 | Glass et al. | |
| 3,368,063 A * | 2/1968 | Kuhn | A63H 33/3055 219/411 |
| 3,886,680 A * | 6/1975 | Rich | A63H 33/3055 446/180 |
| 4,064,812 A * | 12/1977 | Commanda | A47B 3/083 108/36 |
| 4,332,101 A * | 6/1982 | Tomita | A63H 33/30 40/406 |
| 4,333,258 A * | 6/1982 | McCaslin | A63H 33/3055 340/384.3 |
| 4,515,359 A * | 5/1985 | Mariol | A63H 33/3055 108/33 |
| 4,886,045 A * | 12/1989 | Ducate, Jr. | A47J 37/0713 126/41 R |
| 5,277,106 A * | 1/1994 | Raymer | A47J 37/0786 108/159 |
| 5,451,745 A * | 9/1995 | Goldberg | A63H 33/3055 219/386 |
| 5,716,253 A * | 2/1998 | Aoki | A63H 33/22 446/14 |

(Continued)

*Primary Examiner* — Joseph B Baldori
(74) *Attorney, Agent, or Firm* — Boudwin Intellectual Property; Daniel Boudwin

(57) ABSTRACT

A children's grill toy including a housing. The housing including a base and plurality of side walls. The plurality of sidewalls forms an interior volume. At least of the sidewalls has at least one door thereon. Atop the side walls is a grill lid. The interior of the housing also includes a grill structure. The grill structure includes a number of grates. The grates are food safe and made from metal. Further, there is a heating element placed under the grates. The heating element is connected to a power source and a series of knobs. The knobs will allow the heating element to have a varying heat. A steaming element is also included. The steaming element has a separate heating element. This heating element will be able to heat water located in a water tank connected to the steaming element.

17 Claims, 3 Drawing Sheets

(56) References Cited

U.S. PATENT DOCUMENTS

| | | | |
|---|---|---|---|
| 6,041,773 A | 3/2000 | Rosenquist | |
| 6,311,866 B1 | 11/2001 | Sambonet et al. | |
| 6,450,851 B1 * | 9/2002 | Rehkemper | A63H 33/28 |
| | | | 446/15 |
| 6,792,935 B2 * | 9/2004 | Williams | A47J 37/0763 |
| | | | 126/25 R |
| 6,935,327 B1 * | 8/2005 | Williams | A47J 36/06 |
| | | | 126/19 R |
| 7,104,667 B2 * | 9/2006 | Keller | A47J 36/06 |
| | | | 362/234 |
| 7,744,443 B2 * | 6/2010 | Cassidy | A63H 33/3055 |
| | | | 446/397 |
| 8,076,616 B2 | 12/2011 | Stanger | |
| 8,261,732 B2 * | 9/2012 | Contarino, Jr. | A47J 37/067 |
| | | | 126/190 |
| 8,426,775 B2 * | 4/2013 | Frank | A63H 33/3055 |
| | | | 219/201 |
| 8,522,769 B2 * | 9/2013 | Ducate, Jr. | A47J 37/0786 |
| | | | 108/102 |
| 8,568,194 B2 * | 10/2013 | Fein | A63H 33/3055 |
| | | | 446/147 |
| 8,607,777 B2 * | 12/2013 | Ducate, Jr. | A47J 37/0786 |
| | | | 126/1 R |
| 2003/0029436 A1 * | 2/2003 | Carden | A47J 37/0786 |
| | | | 126/41 R |
| 2017/0143162 A1 * | 5/2017 | Olsen | A47J 37/07 |

* cited by examiner

CHILDREN'S TOY FOR GRILLING

CROSS REFERENCE TO RELATED APPLICATIONS

This application claims the benefit of U.S. Provisional Application No. 62/686,839 filed on Jun. 19, 2018. The above identified patent application is herein incorporated by reference in its entirety to provide continuity of disclosure.

BACKGROUND OF THE INVENTION

The present invention relates to a children's toy for grilling. More particularly, the present invention provides a children's toy grilling with a grill top.

Children like to help their parents with house hold activities or at least pretend to help. When a parent is conducting an activity, which requires caution to prevent risk of injury a parent may not want a child around to help. This can make the child feel excluded or left out. Further, they may not understand that the parent has good intentions for not including them in the activity. One such activity is grilling food. If a person is not careful a child or even the person themselves may get burned or otherwise injured.

Consequently, there is a need for an improvement in the art of including children in such activities as grilling. The present invention substantially diverges in design elements from the known art, and solves a problem faced by parents daily, how to safely include a child. In this regard, the present invention substantially fulfills these unmet needs.

SUMMARY OF THE INVENTION

In view of the foregoing disadvantages inherent in the known types of grill toys now present in the prior art, the present invention provides a Children's grill wherein the same can be utilized for providing convenience for the user when safely including a child in the activity of grilling. The present system comprises a children's toy for grilling, that includes a grill top that will not rise to a high temperature and a foldable table attached to the grill.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
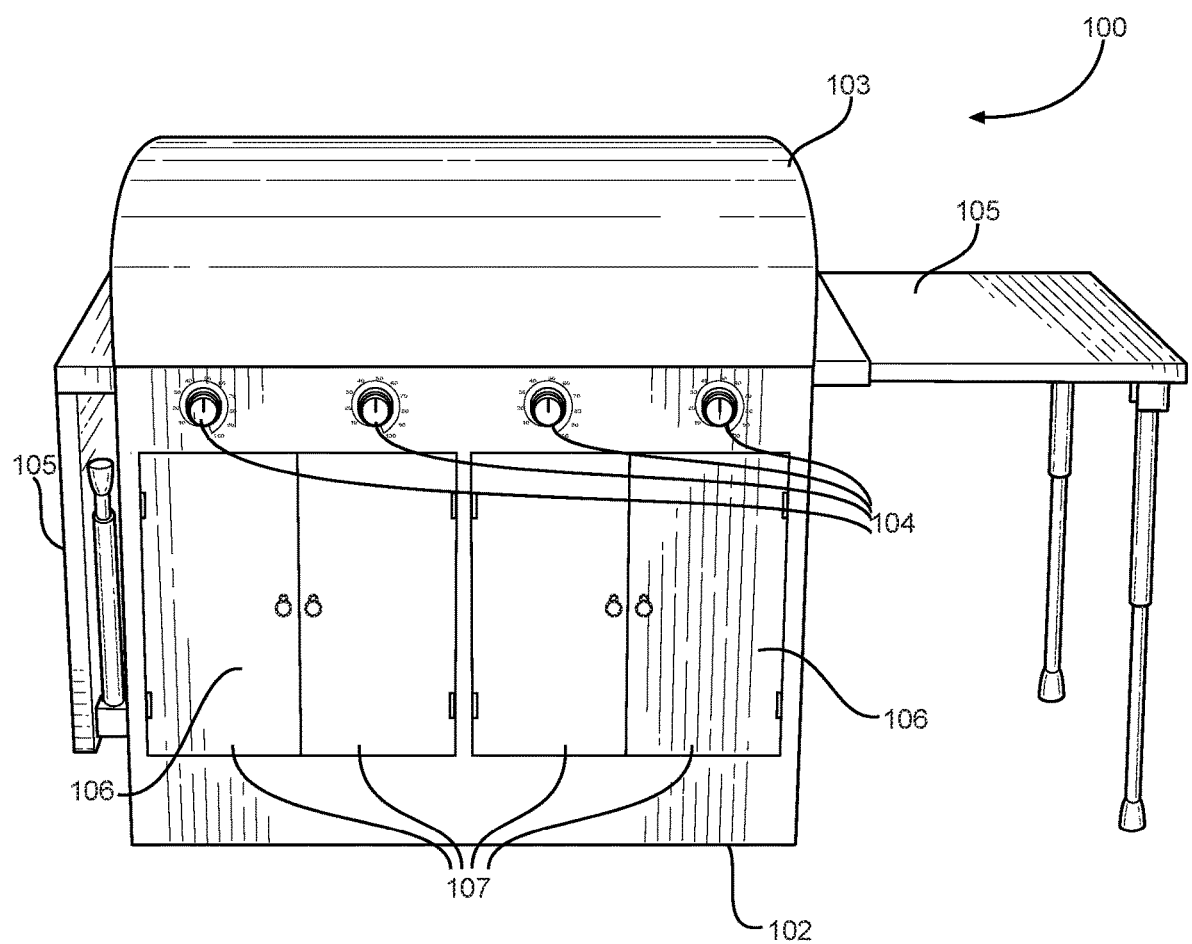
FIG. 1 shows a front view of an embodiment of the child's toy grill.

Reference is made herein to the attached drawings. Like reference numerals are used throughout the drawings to depict like or similar elements of the children's toy for grilling. For the purposes of presenting a brief and clear description of the present invention, the preferred embodiment will be discussed as used for children's toy for grilling. The figures are intended for representative purposes only and should not be considered to be limiting in any respect.

Referring now to FIG. 1, there is shown front view of an embodiment of the child's toy grill. The toy has the general shape and function of a grill. The grill 100 has a base 102, side walls 101, and a lid 103 that define and interior volume. In the present embodiment, a plurality of knobs 104 are shown on a front wall 101. There are compartments 106 for storing various grilling items located in the front wall 101 below the knobs 104. Further, there are foldable shelves 105 attached to side walls of the grill.

In one embodiment, the compartments 106 may be cabinets. These cabinets may be separated by interior walls or open to one big storage compartment. The cabinets may have one or more doors 107. The doors may be hingedly attached to the front wall 101. In another embodiment, the compartments may be one or more drawers. The drawers can be attached to tracks within the interior or the grill and can open through the front wall.

Figure 2:
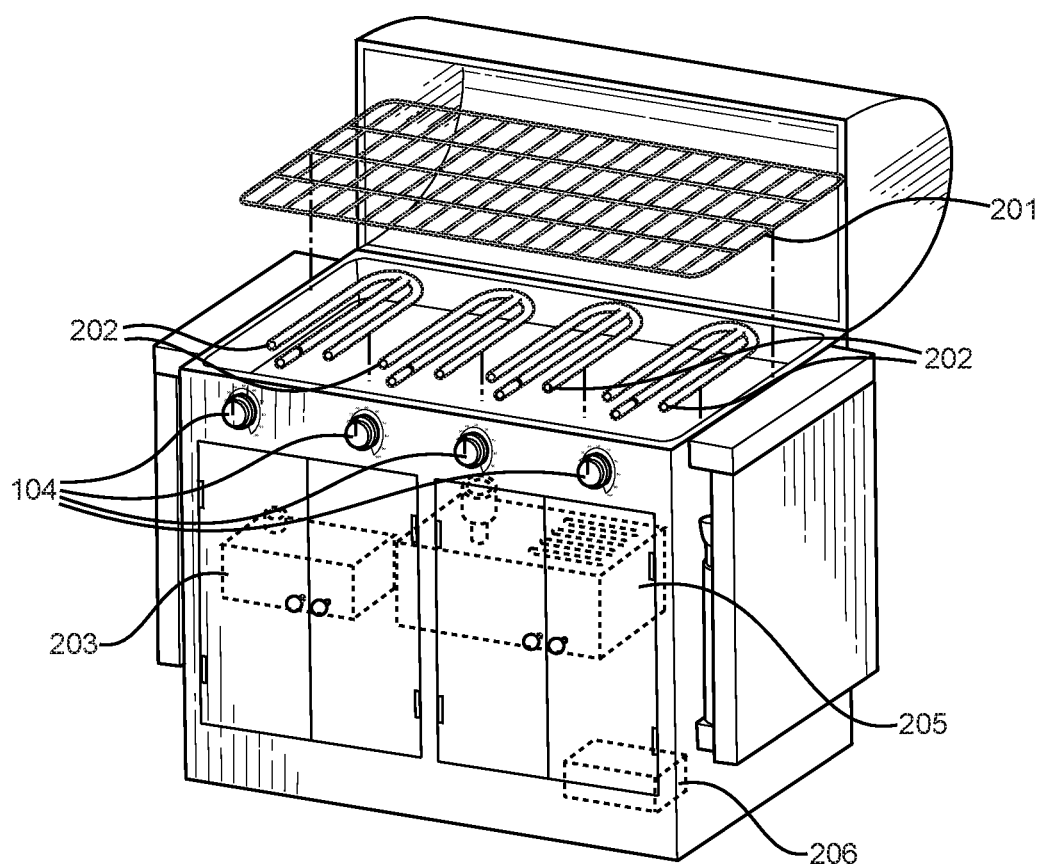
FIG. 2 shows the internals of an embodiment of the child's toy grill.

Referring to FIG. 2, there is shown an embodiment of internals for the child's grill toy. The child's toy may resemble a real grill and have metal grill slats 201 or may be a solid sheet similar to a griddle. In an embodiment, there is a grease trap 203 to catch any residual droppings from real food placed on the grill. In this embodiment the grease trap 203 is provided because cooked foods can still drip at lower temperatures. There is a power source 206 that is located within the grill and designed to power the grill. This power source 206 may be a battery or a hard wire.

In one embodiment, there is a heating element 202 to produce a limited amount of heat. In one embodiment there heating element 202 is a plurality of heating units. This will allow the heat to vary across the grill surface. The segments also allow the heating element 202 to produce varying amounts of heat or a single constant temperature. In one embodiment the heating element 202 is operably connected to the knobs 104 on the front of the grill. In this embodiment the knobs 104 can adjust the temperature of the heating element. In an embodiment the heating element is only capable of heating in a range of 100 degrees F. to 130 degrees F. At this temperature range, a child will experience the heat from a grill but will not sustain severe burns. In another embodiment, the temperature range may be from 90 degrees F. to 100 degrees F., at this range even a slight burn will be highly unlikely.

In an embodiment of the child's toy grill a steaming element 205 may be incorporated to resemble grill fumes. The steam element 205 may have an attached water tank to add water to the element. This element should be properly insulated to avoid any contact with an element hot enough to burn a child. This steam element may produce steam that will rise off of the grill to give an appearance of a real grill while cooking real food.

Figure 3:
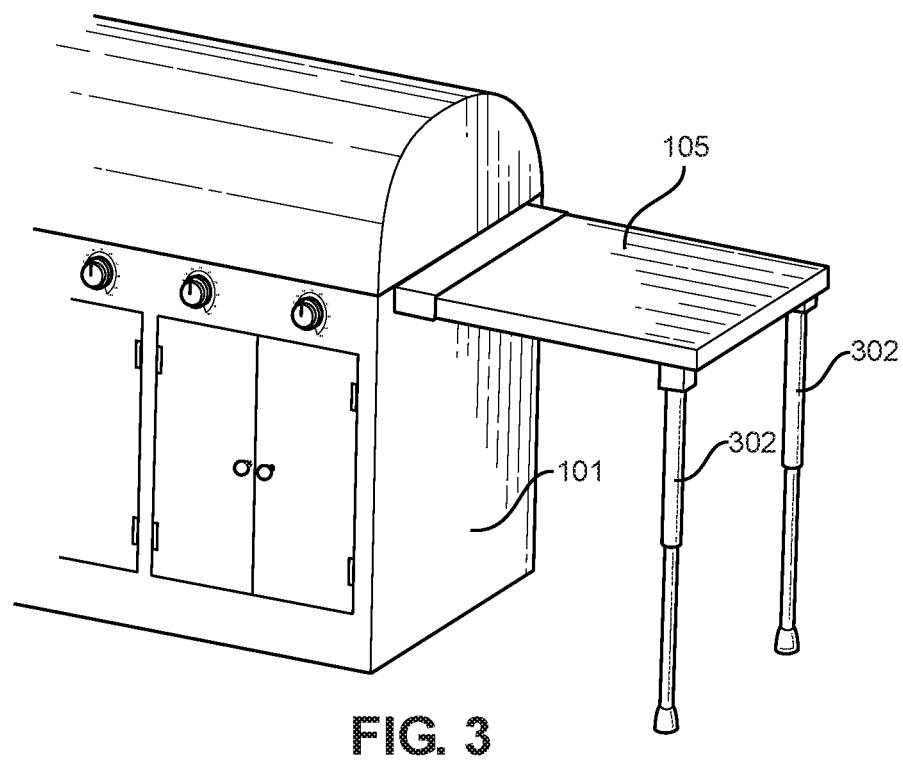
FIG. 3 shows a zoomed view of an embodiment of the child's toy grill with a foldable shelf attached.
Figure 4:
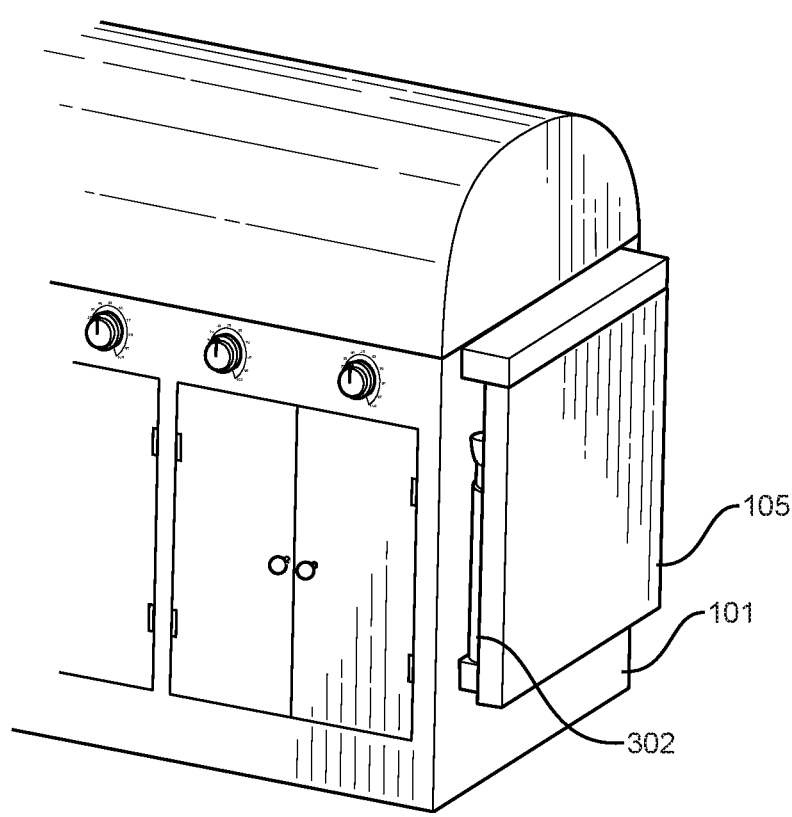
FIG. 4 shows a zoomed view of an embodiment of the child's toy grill with collapsible legs.

Referring to FIGS. 3 and 4, there are zoomed views of the foldable shelf 105. In one embodiment there is at least one foldable shelf attached to a side wall 101. In another embodiment there is a shelf attached to each side wall 101. The shelf is hingedly attached to the side wall such that it can go from a vertical storage position to a horizontal working position. In one embodiment, the shelf is held in place by adjustable legs 302. The legs may be attached to the corners opposite the hinge connections. The legs may hingedly attached to an underside of the table. This will allow them to be folded and stored under the table. In one embodiment the legs are telescoping to allow for an adjustable height to level the table on any surface.

Figure 5:
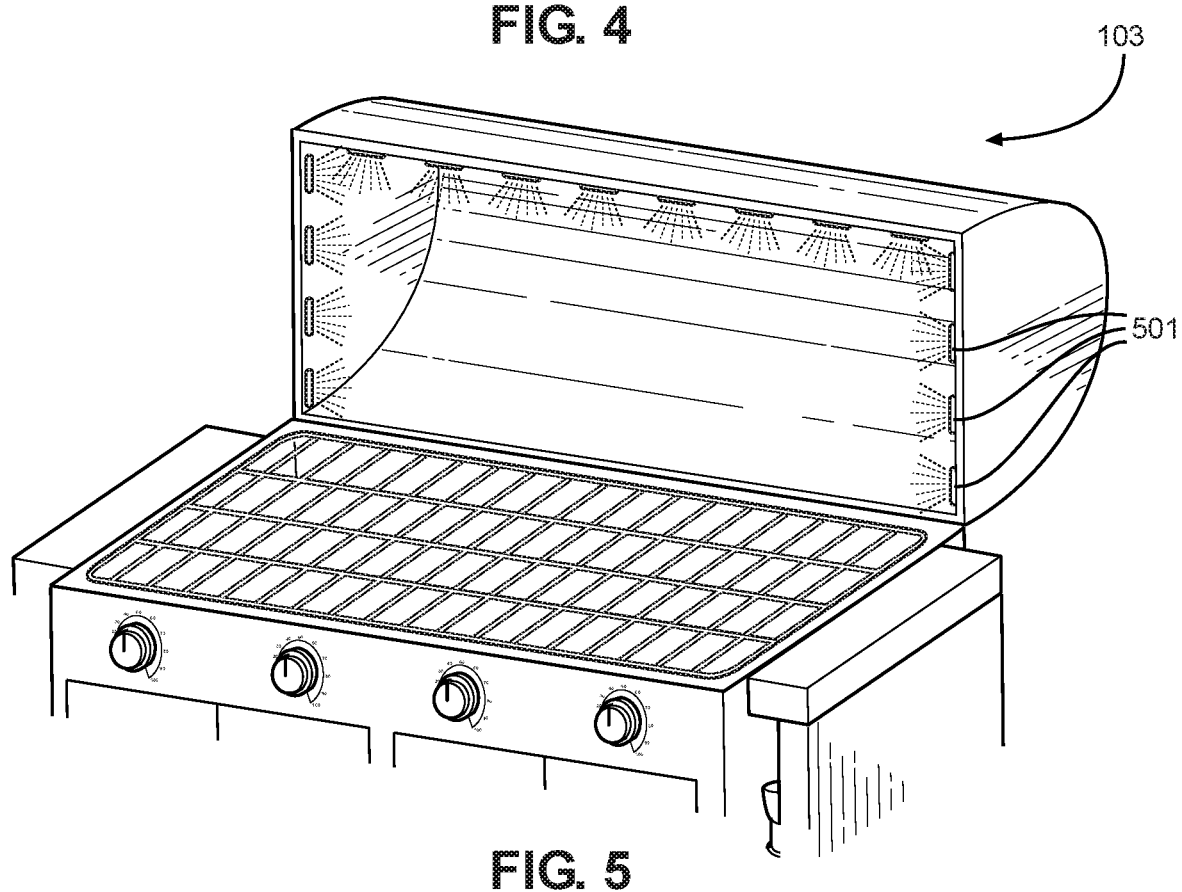
FIG. 5 shows a zoomed view of an embodiment of the child's toy grill with lights around the lid.

Referring to FIG. 5, there is shown an embodiment the of the child's toy with lights attached to a lip of the lid. The lid 501 may be hingedly attached to the rear wall of the grill structure. This will allow the lid to move from a closed position to an open position. Further, in one embodiment there may be lights 501 disposed on a lip of the lid 103. In another embodiment the lights 501 may be on the underside of the lid 103. These lights 501 may be LED lights. The lights 501 may be coupled to a switch or be configured to automatically activate when the lid is opened. The lights may be connected to the same power source 206 as the heating element or have their own power source such as a battery. The lights 501 should be of a kind that can resist heat so as to not melt on the grill.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A children's toy comprising:
   a grill structure which includes a base with a set of sidewalls raising therefrom;
   a lid is removably disposed on a top of at least one sidewall of the set of sidewalls;
   an interior volume defined by the set of sidewalls, the base and the lid;
   a grill top grate placed within at least one sidewall of the set of sidewalls at the top of at least one sidewall of the set of sidewalls such that the lid covers the grill top grate;
   at least one shelf is attached to at least one sidewall of the set of sidewalls of the grill structure, wherein the shelf is foldable from a horizontal position, to a vertical position;
   a power source secured to the grill structure, wherein the power source is electronic;
   a heating element located within the grill structure, beneath the grill top grate, wherein the heating element is electrically coupled to the power source;
   wherein the heating element is configured to heat in a range consisting of 90 degrees Fahrenheit to 130 degrees Fahrenheit;
   a steamer unit placed within the interior volume, wherein the steamer unit is disposed within the grill and releases steam;
   wherein the steamer unit is in operation with a water tank;
   wherein the steamer element is insulated.

2. The children's toy of claim 1, further comprising: knobs disposed on an external face of the grill.

3. The children's toy of claim 2, wherein, the knobs control the temperature of the heating element.

4. The children's toy of claim 1, further comprising: a pair of foldable legs hingedly attached to the underside of the shelf.

5. The children's toy of claim 4, wherein the pair of foldable legs are telescoping.

6. The children's toy of claim 1, further comprising: a plurality of lights placed on the underside of the lid.

7. The children's toy of claim 6, wherein the lights are LED.

8. The children's toy of claim 6, wherein the plurality of lights are coupled to a switch.

9. The children's toy of claim 6, wherein the plurality of lights automatically activate when the lid is opened.

10. The children's toy of claim 1, further comprising: a grease trap located beneath the grill top grate.

11. The children's toy of claim 1, wherein the heating element is configured to heat in a range consisting of 100 degrees Fahrenheit to 130 degrees Fahrenheit.

12. The children's toy of claim 1, wherein the heating element is configured to heat in a range consisting of 90 degrees Fahrenheit to 100 degrees Fahrenheit.

13. The children's toy of claim 1, further comprising a plurality of compartments in the front wall.

14. The children's toy of claim 13, wherein the plurality of compartments define a plurality of cabinets, each comprising a pair of doors.

15. The children's toy of claim 1, wherein the at least one shelf is a pair of shelves that are hingedly affixed to opposing sides of the housing.

16. A children's toy comprising:
   a grill structure which includes a base with a set of sidewalls raising therefrom;
   a lid is removably disposed on a top of at least one sidewall of the set of sidewalls;
   a plurality of lights placed on the underside of the lid;
   an interior volume defined by the set of sidewalls, the base and the lid;
   a grill top grate placed within at least one sidewall of the set of sidewalls at the top of at least one sidewall of the set of sidewalls such that the lid covers the grill top grate;
   a plurality of compartments in the front wall;
   at least one shelf is attached to at least one sidewall of the set of sidewalls of the grill structure, wherein the shelf is foldable from a horizontal position, to a vertical position;
   a pair of foldable legs hingedly attached to the underside of the shelf;
   a power source secured to the grill structure, wherein the power source is electronic;
   a heating element located within the grill structure, beneath the grill top grate, wherein the heating element is electrically coupled to the power source;
   wherein the heating element is configured to heat in a range consisting of 90 degrees Fahrenheit to 130 degrees Fahrenheit;
   a plurality of knobs disposed on an external face of the grill;
   a steamer unit placed within the interior volume, wherein the steamer unit is disposed within the grill and releases steam;
   wherein the steamer unit is in operation with a water tank;
   wherein the steamer element is insulated.

17. A children's toy consisting of:
a grill structure which includes a base with a set of sidewalls raising therefrom;
a lid is removably disposed on a top of at least one sidewall of the set of sidewalls;
a plurality of lights placed on the underside of the lid;
an interior volume defined by the set of sidewalls, the base and the lid;
a grill top grate placed within at least one sidewall of the set of sidewalls at the top of at least one sidewall of the set of sidewalls such that the lid covers the grill top grate;
a plurality of compartments in the front wall;
at least one shelf is attached to at least one sidewall of the set of sidewalls of the grill structure, wherein the shelf is foldable from a horizontal position, to a vertical position;
a pair of foldable legs hingedly attached to the underside of the shelf;
a power source secured to the grill structure, wherein the power source is electronic;
a heating element located within the grill structure, beneath the grill top grate, wherein the heating element is electrically coupled to the power source;
wherein the heating element is configured to heat in a range consisting of 90 degrees Fahrenheit to 130 degrees Fahrenheit;
a plurality of knobs disposed on an external face of the grill;
a steamer unit placed within the interior volume, wherein the steamer unit is disposed within the grill and releases steam;
wherein the steamer unit is in operation with a water tank;
wherein the steamer element is insulated.

* * * * *